Figure 1:
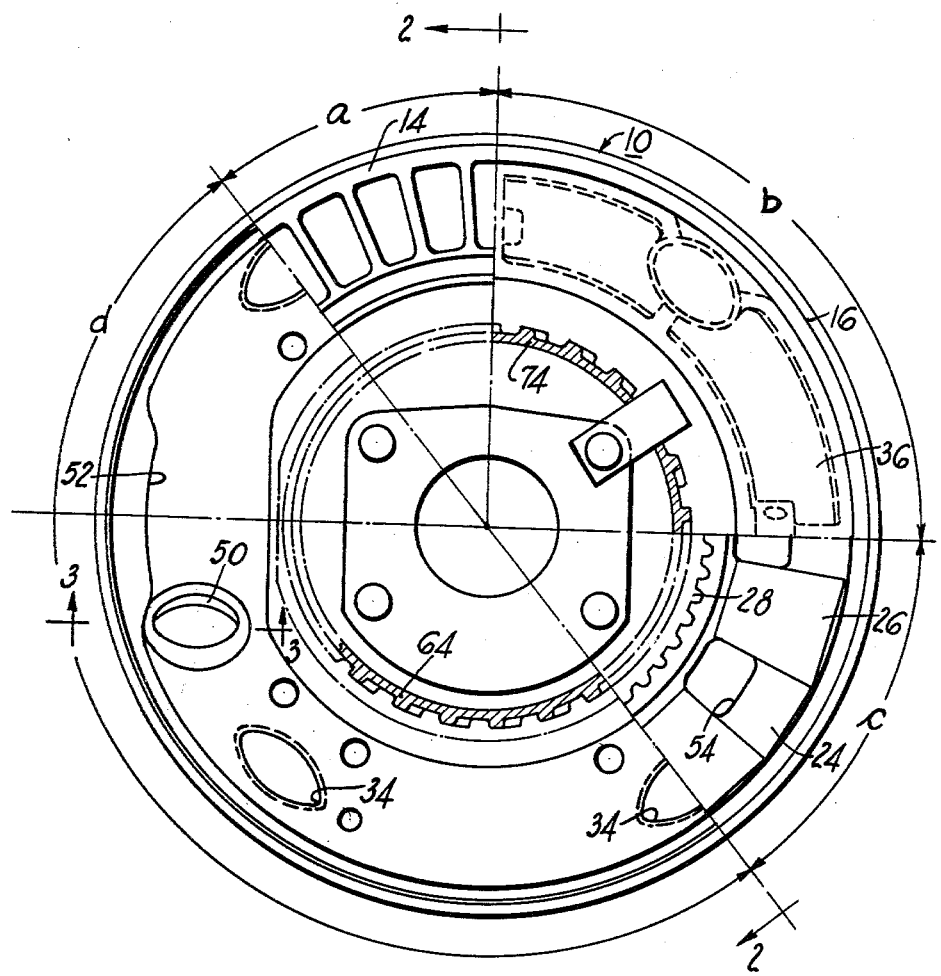

July 20, 1965

R. T. BURNETT 3,195,691

ACTUATOR FOR DISK BRAKE

Original Filed Jan. 13, 1954

2 Sheets-Sheet 1

INVENTOR.
RICHARD T. BURNETT
BY
Sheldon F. Raizes
ATTORNEY

July 20, 1965   R. T. BURNETT   3,195,691
ACTUATOR FOR DISK BRAKE
Original Filed Jan. 13, 1954   2 Sheets-Sheet 2
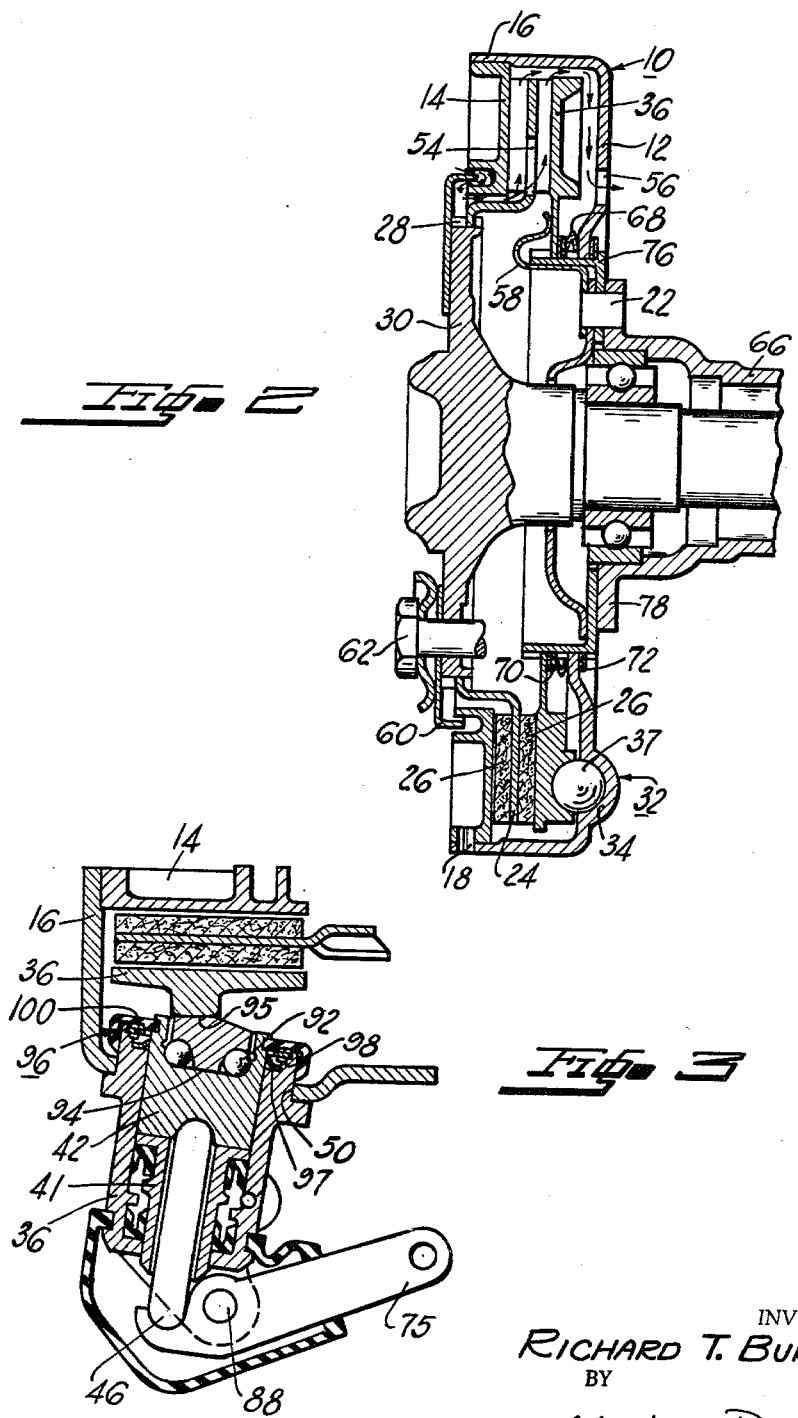
INVENTOR.
RICHARD T. BURNETT
BY
Sheldon F. Raizes
ATTORNEY

United States Patent Office 3,195,691
Patented July 20, 1965

3,195,691
ACTUATOR FOR DISK BRAKE
Richard T. Burnett, South Bend, Ind., assignor to The Bendix Corporation, South Bend, Ind., a corporation of Delaware
Application Aug. 8, 1960, Ser. No. 48,160, now Patent No. 3,096,855, dated July 9, 1963, which is a division of application Ser. No. 403,672, Jan. 13, 1954, now Patent No. 2,955,681, dated Oct. 11, 1960. Divided and this application Dec. 13, 1962, Ser. No. 244,526
1 Claim. (Cl. 188—106)

This invention relates to disk brakes and more particularly to improvements in disk type brakes wherein the friction-producing elements are self-energizing components of the brake. This application for patent is a division of my copending application Serial No. 48,160, filed August 8, 1960, now Patent No. 3,096,855, which in turn is a division of U.S. Patent No. 2,955,681, filed January 13, 1954.

An object of the invention is to provide improved actuating means for disk braking.

Another object of the invention is to provide a disk brake with a combined fluid and mechanical actuator wherein the mechanical actuator is operable without disturbing the fluid actuator and the fluid actuator is operable without disturbing the mechanical actuator.

The above and other objects and features of the invention will appear more fully hereinafter from a consideration of the following description, taken in connection with the accompanying drawings, wherein a plurality of embodiments of the invention are illustrated by way of example.

In the drawings:

FIGURE 1 illustrates a rear wheel disk brake and is a composite view illustrating in segments; (a) the outer surface of the brake reaction plate, (b) a section of the brake assembly taken on a plate passing between the pressure plate and rotor looking toward the inboard side of the brake, (c) a section of the brake assembly between the rotor and reaction plate looking toward the inboard side of the brake, (d) is a section view of the brake viewed in a plane passing between the pressure plate and backing plate, viewed toward the inboard side of the vehicle;

FIGURE 2 is a section view of the brake assembly taken on line 2—2 of FIGURE 1; and FIGURE 3 is a view taken along section line 3—3 of FIGURE 1 which illustrates a parking brake for mechanically applying a brake.

Referring to FIGURE 1, a U-shaped cross section member designated generally by reference numeral 10 is splined at 64 to a cup-shaped nonrotatable member 76. The U-shaped cross section member 10 consists of a backing plate 12 and a reaction plate 14 arranged in parallel relationship to the backing plate and secured to a substantially cylindrical flange 16 of the backing plate 12 by a plurality of fastening members 18.

A rotor 24 having a plurality of friction pads 26 on either side thereof has splined connection 28 with a rotatable member such as axle flange 30. A plurality of camming devices 32 consisting of ball-ramp combinations are interposed between pressure plate 36 and backing plate 12. The camming devices 32 consist of oppositely facing ramps 34 having a ball 37 associated therewith and adapted to ascend the ramp portions upon relative circumferential movement of the pressure plate 36 and backing plate 12. As the ball 37 mounts the ramps 34, it imparts axial applying thrust on the pressure plate 36 causing engagement with the rotor 24.

Two spring washers 68 are compressed between retaining ring 72 and support 12 thereby urging the latter into engagement with retaining ring 72. Return springs 58 are used to yieldably urge the pressure plate 36 to retracted position. The backing plate 12 and the pressure plate 36 have splined connections 64 and 74 with a cup-shaped member 76 secured by fastening means 22 to a flange 78 on axle housing 66. These splined connections allow a limited movement of the pressure plate 36 in one direction of rotation and a limited movement of the backing plate 12 in the other direction of rotation.

Openings 54 in rotor 24 permit circulation of air on either side of the rotor, the air then being expelled through openings 56 formed in the backing plate 12. This circulation of air as a coolant through the brake assembly as shown by arrows in FIGURE 2 produces lower operating temperatures thereby reducing thermal effects on the braking operation.

The brake assembly is provided with a dust cover 60 which may be secured to the rotatable axle flange 30 in some suitable manner such as by bolts 62.

FIGURE 3 illustrates a mechanically applied parking brake actuator used in combination with a hydraulically actuated wheel cylinder device 38 received in opening 50 of the support member 12. The mechanically actuating means consists of a lever 75 fulcruming on pin 88 and bearing against thrust rod 46 which extends through a piston 41 and abuts a force transmitting member 42. A hardened insert 90 is rotatably mounted on anti-friction bearing 92 located in the head of the force transmitting member. The bearing 92 is retained in position by snap rings 94 located on either side of the bearing. The insert 90 is thus mounted in a manner permitting rolling movement. The contact point 95 between the pressure plate 36 and insert 90 is offset from the axis of rotation of the insert 90 so that rolling movement of the insert 90 is produced when the pressure plate 36 moves circumferentially. In this way frictional contact between the pressure plate 36 and abutting actuating means is reduced to a minimum since the bearing 92 substitutes for a frictional sliding effect a slight rolling motion between the engaging surfaces of the pressure plate and actuator. Automatic adjusting mechanism 96 consisting of a one-way clutch, varies the retracted position of piston 42 as a function of the extent of lining wear on the rotor of the brake. Automatic adjustor 96 includes a toothed washer 97 which bites into the periphery of the piston 42 preventing further retractile movement of the piston 42 when the adjustor is in the position indicated in FIGURE 3. Clearance between the rotatable and nonrotatable members is established by the distance between the washer 97 in the position indicated in FIGURE 3 and the point of contact of the washer 97 with annulus 98 which is retained in position by retaining ring 100.

In operation, fluid pressure from a master cylinder source (not shown) actuates piston 41 and force transmitting member 42 producing frictional engagement of pressure plate 36 with rotor 24. The splined connections 74 and 28 of the pressure plate 36 and rotor 24 permit axial movement of both these members to bring about frictional engagement of the rotor 24 and reaction plate 14. When the pressure plate 36 contacts the rotor 24, it undergoes slight circumferential movement whereupon camming devices 32 produce additional axial thrust thereon, clamping the rotor 24 between the pressure plate 36 and reaction plate 14.

The torque reaction from frictional interengagement of the pressure plate 36 and rotor 24, is transmitted through the camming devices 32 to the backing plate 12 having splined connection with cup-shaped member 76 which transfers the torque reaction to the nonrotatable axle housing 66. Torque reaction from engagement on rotor 24 with reaction plate 14 is transmitted to the backing plate 12 by pins 18.

Referring to segment *d* of FIGURE 1, the splined connection 64 between the backing plate 12 and cup-shaped member 76 is so designed that the interfitting notches contact immediately to resist relative turning of the backing plate 12 and member 76 in one direction. That is, the backing plate anchors on splined connection 64 in braking forward rotation of rotor 24 as torque reaction is transmitted thereto via the camming devices 32 and pins 18.

It is necessary that the rear wheel brakes do not diminish in effectiveness with reverse vehicle motion because of the reduced effectiveness of the front wheel brakes. The anchoring action of the backing plate 12 against the cup-shaped member 76 with reverse vehicle motion would de-energize the brake, therefore anchoring in this direction of motion is accomplished through the splined connection 74 of the pressure plate 36 with the cup-shaped member 76. This is best seen in sector *b* of FIGURE 1. With reverse direction of vehicle motion, the engagement of the pressure plate 36 with the rotor 24 tends to cause circumferential movement of the pressure plate in a direction opposite that for forward braking. The interlocking teeth of splined connection 74 abut to transmit to the cup-shaped member 76 the torque reaction from engagement of pressure plate 36 with rotor 24. The torque reaction from engagement of rotor 24 with reaction plate 14 is transmitted to the pressure plate via the backing plate 12 and camming devices 32. With circumferential movement of the pressure plate, the camming devices 32 again produce additional axial thrust thereon, frictionally clamping the rotor 24 between the reaction plate 14 and the pressure plate 36. In reverse braking, as well as forward braking, the direction of motion of the input force exerted by the wheel cylinder on the pressure plate 36 is on a line along the path of the resultant axial and circumferential movement of the pressure plate 36.

The spinning movement of rotor 24 has a pumping effect, circulating air through the openings 54 in the rotor and openings 56 in the support plate thereby reducing the operating temperatures and minimizing thermal effects on the braking characteristics.

When the brake is mechanically applied, the lever 75 is actuated to slide the thrust link 46 through the piston 41 and move force transmitting member 42 to produce frictional engagement of pressure plate 36 with rotor 24. It should be noted that the mechanical operation does not disturb the piston 41 and the hydraulic operation does not disturb the mechanical linkage 46 and 75.

Although a certain particular embodiment of my invention has been described, it will be understood by those skilled in the art that the object of the invention may be attained by use of constructions different in certain respects from that disclosed without departing from the underlying principles of the invention.

I claim:

In a disk brake: a rotor, friction means for engaging said rotor, a fluid cylinder housing having a bore therein, a piston T-shaped in cross section slidably mounted in said bore and having the flanged portion in front, a force transmitting member slidable in said bore abutting the front of said piston and operatively connected to said friction means, first sealing means engaging the wall of said bore and attached to said piston for slidable movement therewith, said bore having an end wall at the rear thereof with the rear of said piston extending through an opening in said rear wall, second sealing means interposed between said piston and said wall and located to the rear of said first sealing means, said second sealing means being secured to said wall, said seals forming an expansible chamber therebetween, a fluid inlet for communicating fluid to said chamber whereby fluid force will act on said flange to thrust said piston and force transmitting means forwardly and thereby said friction means into engagement with said rotor, an opening in said piston extending the longitudinal length thereof, a rigid member extending through said opening with the front end of said rigid member having a relative motion connection with said force transmitting member, mechanical actuating means operatively engaging the rear of said rigid member for moving the same and said force transmitting member forwardly and thereby said friction means into engagement with said rotor whereby said friction means is mechanically and fluidly actuated.

References Cited by the Examiner

UNITED STATES PATENTS

| 1,849,583 | 3/32 | Milan | 188—73 |
| 2,109,722 | 3/38 | Fawick | 188—72 |

FOREIGN PATENTS 478,381  1/38  Great Britain.

ARTHUR L. LA POINT, *Primary Examiner.*

EUGENE G. BOTZ, *Examiner.*